US008060753B2

(12) United States Patent
King

(10) Patent No.: US 8,060,753 B2
(45) Date of Patent: Nov. 15, 2011

(54) BIOMETRIC PLATFORM RADIO IDENTIFICATION ANTI-THEFT SYSTEM

(75) Inventor: Jeffrey G. King, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 1176 days.

(21) Appl. No.: 11/074,561

(22) Filed: Mar. 7, 2005

(65) Prior Publication Data
US 2006/0200683 A1 Sep. 7, 2006

(51) Int. Cl.
G06F 21/00 (2006.01)
G06F 11/30 (2006.01)
G08B 29/00 (2006.01)
G05B 19/00 (2006.01)

(52) U.S. Cl. ........ 713/186; 713/159; 713/169; 713/171; 713/172; 713/185; 713/193; 713/194; 726/2; 726/4; 726/5; 726/6; 726/9; 726/27; 726/28; 726/29; 726/34; 726/35; 340/426.1; 340/426.35; 340/5.2; 340/5.52; 340/5.72; 340/5.8; 340/5.81; 340/5.82; 340/10.1

(58) Field of Classification Search .................... 713/186
See application file for complete search history.

(56) References Cited

U.S. PATENT DOCUMENTS

| 5,889,472 | A  | * | 3/1999  | Nagel et al. ............... 340/5.33 |
| 6,078,265 | A  | * | 6/2000  | Bonder et al. ............. 340/5.23 |
| 6,483,433 | B2 | * | 11/2002 | Moskowitz et al. ........ 340/568.1 |
| 6,681,444 | B2 | * | 1/2004  | Breed et al. .................... 16/82 |
| 7,151,454 | B2 | * | 12/2006 | Washington ............... 340/572.1 |
| 7,164,354 | B1 | * | 1/2007  | Panzer ...................... 340/539.15 |
| 7,319,397 | B2 | * | 1/2008  | Chung et al. ............... 340/572.4 |
| 7,533,809 | B1 | * | 5/2009  | Robinson et al. ............. 235/382 |
| 7,762,457 | B2 | * | 7/2010  | Bonalle et al. ................ 235/383 |
| 7,793,109 | B2 | * | 9/2010  | Ortiz ............................ 713/186 |
| 2002/0140542 | A1 | * | 10/2002 | Prokoski et al. ............. 340/5.52 |
| 2003/0003892 | A1 | * | 1/2003  | Makinen ...................... 455/345 |
| 2003/0231550 | A1 | * | 12/2003 | Macfarlane ................... 367/198 |
| 2004/0111360 | A1 | * | 6/2004  | Albanese ......................... 705/38 |
| 2004/0118916 | A1 | * | 6/2004  | He ................................. 235/383 |
| 2004/0169589 | A1 | * | 9/2004  | Lea et al. .................. 340/825.49 |
| 2004/0238621 | A1 | * | 12/2004 | Beenau et al. ................ 235/380 |
| 2004/0252012 | A1 | * | 12/2004 | Beenau et al. ................. 340/5.4 |
| 2004/0257197 | A1 | * | 12/2004 | Beenau et al. ............... 340/5.53 |
| 2005/0055582 | A1 | * | 3/2005  | Bazakos et al. .............. 713/202 |
| 2005/0151629 | A1 | * | 7/2005  | Simoneau ................ 340/426.11 |
| 2005/0192895 | A1 | * | 9/2005  | Rogers et al. ................... 705/39 |
| 2005/0193103 | A1 | * | 9/2005  | Drabik .......................... 709/221 |
| 2005/0218215 | A1 | * | 10/2005 | Lauden ......................... 235/380 |
| 2005/0242921 | A1 | * | 11/2005 | Zimmerman et al. ......... 340/5.2 |
| 2005/0253683 | A1 | * | 11/2005 | Lowe ........................... 340/5.53 |
| 2005/0278547 | A1 | * | 12/2005 | Hyndman et al. ............ 713/185 |
| 2006/0022794 | A1 | * | 2/2006  | Determan et al. ........... 340/5.52 |

(Continued)

OTHER PUBLICATIONS

Clarie Swedberg, Jan. 3, 2005, RFID Journal, Triple RFID Protection for Cars, pp. 1-3.*

(Continued)

Primary Examiner — Edan Orgad
Assistant Examiner — Jenise E Jackson

(57) ABSTRACT

Methods, systems, and articles of manufacture consistent with the present invention provide for administering a protected item. An anti-theft key encoded with a radio frequency identification of the user and biometric data of the user is provided. The anti-theft key is associated with the protected item such that the protected item is accessible with the anti-theft key.

14 Claims, 12 Drawing Sheets

U.S. PATENT DOCUMENTS

| | | | |
|---|---|---|---|
| 2006/0038010 A1* | 2/2006 | Lucas | 235/385 |
| 2006/0043176 A1* | 3/2006 | Meyerhofer et al. | 235/384 |
| 2006/0049922 A1* | 3/2006 | Kolpasky et al. | 340/426.13 |
| 2006/0071791 A1* | 4/2006 | Meyers et al. | 340/572.1 |
| 2006/0094405 A1* | 5/2006 | Dupont | 455/414.1 |
| 2006/0094411 A1* | 5/2006 | Dupont | 455/417 |
| 2006/0122934 A1* | 6/2006 | White et al. | 705/50 |
| 2006/0157563 A1* | 7/2006 | Marshall | 235/382 |
| 2006/0173587 A1* | 8/2006 | Oesterling et al. | 701/2 |
| 2006/0178986 A1* | 8/2006 | Giordano et al. | 705/40 |
| 2006/0180647 A1* | 8/2006 | Hansen | 235/375 |
| 2006/0208066 A1* | 9/2006 | Finn et al. | 235/380 |
| 2006/0219776 A1* | 10/2006 | Finn | 235/380 |
| 2006/0247984 A1* | 11/2006 | Shaw | 705/28 |
| 2006/0286972 A1* | 12/2006 | Kates | 455/415 |
| 2007/0205876 A1* | 9/2007 | Nguyen | 340/426.12 |
| 2010/0257099 A1* | 10/2010 | Bonalle et al. | 705/50 |

OTHER PUBLICATIONS

Dan Schell, Jul. 1, 2001, RFID: The Ulimate in Car Security, pp. 1-2.*

Björn Nordin, "Match-on-Card Technology." Precise Biometrics White Paper, Apr. 2004.

Atallah et al., "A Survey of Anti-Tamper Technologies," CROSSTALK The Journal of Defense Software Engineering, Nov. 2004.

* cited by examiner

BIOMETRIC PLATFORM RADIO IDENTIFICATION ANTI-THEFT SYSTEM

BACKGROUND OF THE INVENTION

The present invention generally relates to the field of anti-theft security and, more particularly, to methods and systems of preventing theft using biometric data and radio frequency identification.

Vehicles, software, and other types of items are subject to a risk of being misappropriated by unauthorized personnel. For example, someone might try to steal a vehicle by hard wiring a system to bypass the starting mechanism. Or someone might try to illegally gain access to a software program by cracking its software encryption. The problem of theft is widespread, as evidenced by the well-known theft of automobiles and small arms, and the compromise of sensitive data on computer systems. One of the problems with traditional anti-theft mechanisms is that they do not verify the owner or designated operator of the protected item.

SUMMARY OF THE INVENTION

Methods, systems, and articles of manufacture consistent with the present invention administer a protected item by associating the protected item with an anti-theft key, which has been encoded with a radio frequency identification (RFID) and biometric data. To gain access to the protected item, a user must have the anti-theft key. The user obtains the anti-theft key from an anti-theft key providing device. In the illustrative embodiment, the anti-theft key providing device is a kiosk, however, the anti-theft key providing device is not limited thereto. For example, the anti-theft key providing device can be a computer, a personal data assistant, or another type of device that can acquire user information and communicate with an authenticating authority. The illustrative kiosk obtains information about the user, including for example the user's RFID, biometric data, and personal identification number (PIN), and transmits the user's information to an authenticating authority. The authenticating authority verifies the user's identity by comparing the user's information to information stored in a database. If the user's identity is validated, then the authenticating authority generates an anti-theft key that is specific to that user and to the desired protected item. In order to personalize the anti-theft key to the user, the anti-theft key is encoded with the user's RFID and biometric data. The protected item is associated with the anti-theft key, for example, by encoding the protected item with the anti-theft key. Thus, when the user wants access to the protected item, the anti-theft key associated with the item is verified against the user's RFID and biometric data. Accordingly, the protected item will not be compromised when an imposter misappropriates the anti-theft key.

In accordance with methods consistent with the present invention, a method in a data processing system having a program for administering a protected item is provided. The method comprises the steps of: providing an anti-theft key encoded with a radio frequency identification of the user and biometric data of the user; and associating the anti-theft key with the protected item such that the protected item is accessible with the anti-theft key.

In accordance with articles of manufacture consistent with the present invention, a computer-readable medium containing instructions that cause a data processing system having a program to perform a method for administering a protected item is provided. The method comprises the steps of: providing an anti-theft key encoded with a radio frequency identification of the user and biometric data of the user; and associating the anti-theft key with the protected item such that the protected item is accessible with the anti-theft key.

In accordance with systems consistent with the present invention, a system for administering a protected item is provided. The system comprises: a memory having a program that provides an anti-theft key encoded with a radio frequency identification of the user and biometric data of the user, and associates the anti-theft key with the protected item such that the protected item is accessible with the anti-theft key; and a processing unit that runs the program.

In accordance with systems consistent with the present invention, a system for administering a protected item is provided. The system comprises: means for providing an anti-theft key encoded with a radio frequency identification of the user and biometric data of the user; and means for associating the anti-theft key with the protected item such that the protected item is accessible with the anti-theft key.

In accordance with methods consistent with the present invention, a method in client data processing system having a program for administering a protected item is provided. The method comprises the steps of: obtaining user information including a radio frequency identification of the user and biometric data of the user; transmitting the user information and an identifier of the protected item to a server via a network; and receiving, from the server, an anti-theft key encoded with the radio frequency identification of the user and the biometric data of the user, the anti-theft key being associated with the protected item such that the protected item is accessible with the anti-theft key.

In accordance with systems consistent with the present invention, a client data processing system for administering a protected item is provided. The client data processing system comprises: a memory having a program for administering a protected item that obtains user information including a radio frequency identification of the user and biometric data of the user; transmits the user information and an identifier of the protected item to a server via a network; and receives, from the server, an anti-theft key encoded with the radio frequency identification of the user and the biometric data of the user, the anti-theft key being associated with the protected item such that the protected item is accessible with the anti-theft key; and a processing unit that runs the program.

In accordance with methods consistent with the present invention, a method in a server data processing system having a program for administering a protected item is provided. The method comprises the steps of: receiving, from a client via a network, user information including a radio frequency identification of a user and biometric data of the user; generating an anti-theft key encoded with the radio frequency identification of the user and the biometric data of the user, the anti-theft key being associated with the protected item such that the protected item is accessible with the anti-theft key; and sending the anti-theft key to the client via the network.

In accordance with systems consistent with the present invention, a server data processing system for administering a protected item is provided. The server data processing system comprises: a memory having a program that receives, from a client via a network, user information including a radio frequency identification of a user and biometric data of the user; generates an anti-theft key encoded with the radio frequency identification of the user and the biometric data of the user, the anti-theft key being associated with the protected item such that the protected item is accessible with the anti-theft key; and sends the anti-theft key to the client via the network; and a processing unit that runs the program.

In accordance with methods consistent with the present invention, a method in a data processing system having a program for administering a protected item is provided. The method comprises the steps of: receiving an anti-theft key for the protected item from a server via a network, the anti-theft key being encoded with a radio frequency identification of a user and biometric data of the user; and associating the anti-theft key with the protected item.

In accordance with systems consistent with the present invention, a data processing system for administering a protected item is provided. The data processing system comprises: a memory having a program that receives an anti-theft key for the protected item from a server via a network, the anti-theft key being encoded with a radio frequency identification of a user and biometric data of the user; and associates the anti-theft key with the protected item; and a processing unit that runs the program.

Other features of the invention will become apparent to one with skill in the art upon examination of the following figures and detailed description. It is intended that all such additional systems, methods, features and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
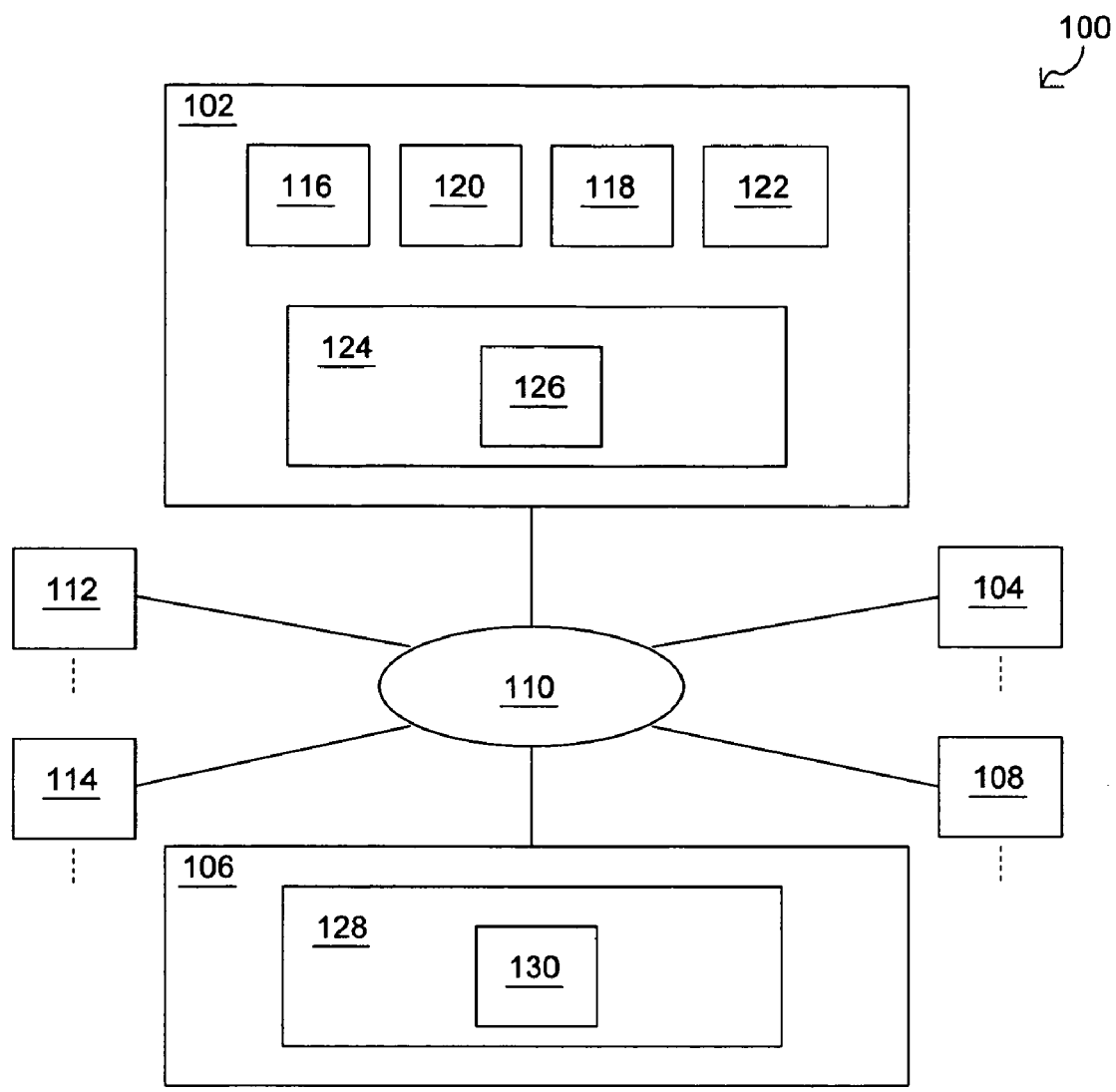
FIG. 1 is a block diagram of an anti-theft system consistent with the present invention.

Reference will now be made in detail to an implementation in accordance with methods, systems, and articles of manufacture consistent with the present invention as illustrated in the accompanying drawings. Wherever possible, the same reference numbers will be used throughout the drawings and the following description to refer to the same or like parts.

Methods, systems, and articles of manufacture consistent with the present invention administer a protected item by associating the protected item with an anti-theft key, which is encoded with a radio frequency identification (RFID) and biometric data. The protected item can be either a physical item, such as a vehicle, weapon, or computing device, or an intangible item, such as a software program or a carrier wave. The protected item can be stored in depots, which are repositories that maintain the protected items. In an illustrative example, there are separate depots for physical items and intangible items. For example, the physical item can be a vehicle garage and the intangible item depot can be a software archival storage system.

In the illustrative example, the anti-theft system comprises one or more kiosks connected to one or more authenticating authorities via a network. A user, who can be an individual or an entity, can gain access to the protected item by obtaining an anti-theft key for that item at one of the kiosks. The kiosk comprises input devices for obtaining information about the user, such as biometric sensors for obtaining biometric data and RFID sensors for obtaining the user's RFID. The input devices may include other conventional input devices such as a keyboard. The kiosk transmits the user's information to an authenticating authority that verifies the user's identity by comparing the user's information to information stored in a database. If the user's identity is validated, then the authenticating authority generates an anti-theft key specific to that user and to the desired protected item. In order to personalize the anti-theft key to the user, the anti-theft key is encoded with the user's RFID and biometric data. The authenticating authority also associates the protected item with the anti-theft key, for example, by requesting the depot to encode the protected item with the anti-theft key. Thus, when the user wants access to the protected item, the anti-theft key associated with the item is verified against the user's RFID and biometric data. Accordingly, the protected item will not be compromised when an imposter misappropriates the anti-theft key.

The anti-theft key can be verified against the user's RFID and biometric data at any desired time of accessing the protected item. For example, the anti-theft key can be verified at one or more of the following times: when the protected item is obtained, when the protected item is turned on, when the protected item is operated, and when the protected item is returned. Further, the user can use the kiosk to transfer the anti-theft key to other users or to enable multiple users to use the anti-theft key. In these cases, the anti-theft key is encoded with RFID and biometric data for the multiple users.

Therefore, unlike conventional anti-theft systems that use RFID keys, methods, systems and articles of manufacture consistent with the present invention provide anti-theft keys that are encoded with a user's RFID, as well as the user's biometric data. Thus, the anti-theft key is not compromised when misappropriated because the anti-theft key is validated against the user's RFID and biometric data.

FIG. 1 is a block diagram of an illustrative anti-theft system 100 consistent with the present invention. Illustrative anti-theft system 100 generally comprises one or more kiosks 102 and 104 connected to one or more authenticating authorities 106 and 108 via a network 110. Each kiosk includes one or more input devices for receiving user information. The user information is transmitted from a kiosk to one of the authenticating authorities, such as authenticating authority 106, which authenticates a user prior to releasing a protected item, such as a platform or software program, to the user. After a user is authenticated, the protected item is provided from a repository, such as a physical item depot 112 or an intangible item depot 114.

As shown in the illustrative example of FIG. 1, the kiosks can include a variety of input devices. The illustrative input devices include a radio frequency identification (RFID)

reader 116, an RFID interrogator 118, a biometric scanner 120, and a keyboard 122, however additional or alternative input devices can be included. The RFID reader is a passive device that reads an RFID when activated by the user. The RFID interrogator is an active device that reads an RFID) when the RFID is within a sensing distance of the RFID interrogator. The biometric scanner obtains biometric information from the user, such as, but not limited to, retina, face, heartbeat, or fingerprint information. Biometric scanners, RFID readers, and RFID interrogators are known in the art and will not be described in more detail herein. Each kiosk further includes a kiosk data processing system 124 that receives user information from the input devices and stores the inputted information in a kiosk database 126. In the illustrative example, the RFID reader is a model MP9310 EPC and the RFID interrogator is a model MP9320 EPC, each manufactured by SAMSys Technologies, Inc. of Durham, N.C., U.S.A. Further, in the illustrative example, the biometric scanner is a model BioAxs 9800 IR iris and fingerprint scanner manufactured by Nextgen ID of San Antonio, Tex., U.S.A.

The kiosks are connected by the network to one or more authenticating authorities. Each authenticating authority comprises an authentication authority data processing system 128 that validates information received from the kiosks against information in an authenticating authority database 130. The authenticating authorities can be, for example, servers located at administrators' locations. As described above, the protected item can be either a physical item, such as a vehicle, weapon, or computing device, or an intangible item, such as a software program or a carrier wave. The protected items can be stored in depots, which are repositories that maintain the protected items. In an illustrative example, there are separate depots for physical items and intangible items. For example, the physical item depot can be a vehicle garage and the intangible item depot can be a software archival storage system.

Figure 2:
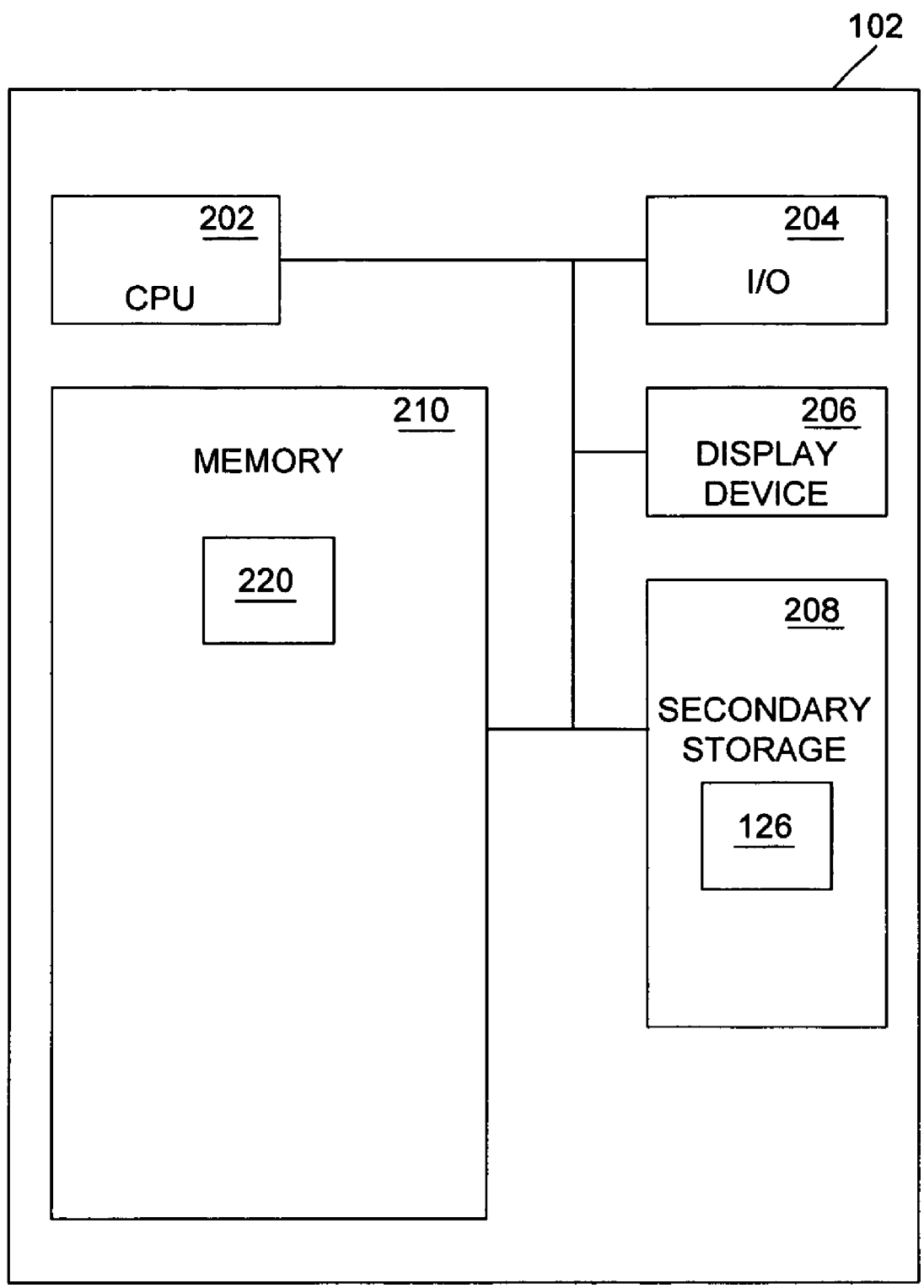
FIG. 2 is a block diagram of a kiosk data processing system consistent with the present invention.

FIG. 2 depicts kiosk data processing system 124 in more detail. The kiosk data processing system comprises a central processing unit (CPU) or processor 202, a display device 204, an input/output (I/O) unit 206, a secondary storage device 208, and a memory 210. The kiosk data processing system may further comprise standard input devices such as a keyboard 122, a mouse or a speech processing means (each not illustrated).

As will be described in more detail below, memory 210 comprises a kiosk program 220 that receives user information, including a user's biometric data and RFID, and initiates a session with an authentication authority to provide an assigned anti-theft key to the user. The anti-theft key corresponds to one or more protected devices. The kiosk program provides a single user mode, a multiple user mode, and an override mode. In the single user mode, a single user provides their user information and is presented with a list of protected devices to which the user's anti-theft key is assigned. The multiple user mode is similar to the single user mode, but provides for multiple users to be assigned to the same protected devices. In the override mode, a user or group of users can assign use of their anti-theft keys to other users. This assignment can include degrees of privilege, such as use for a limited period of time or use of the protected device with other specific devices.

Figure 3:
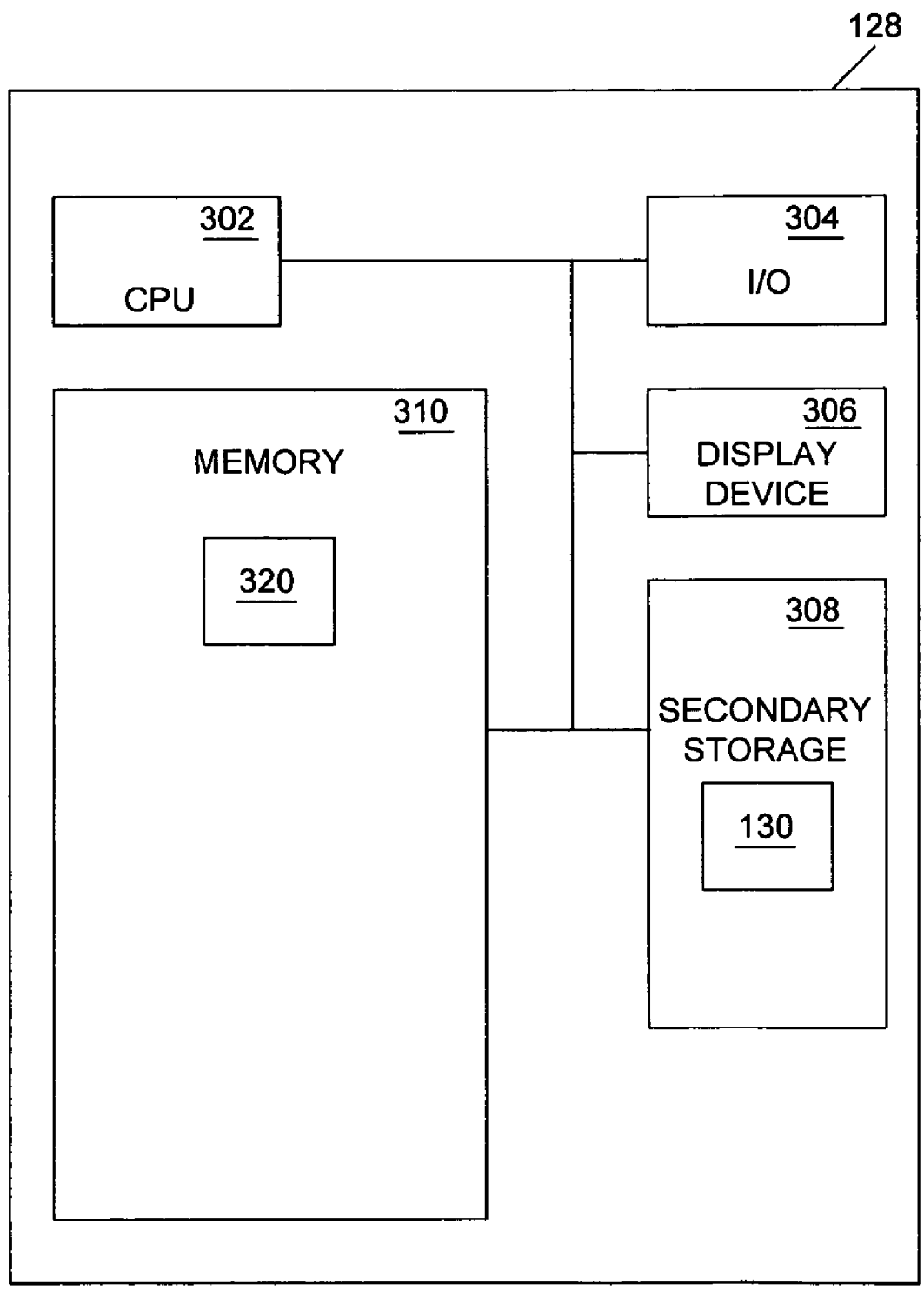
FIG. 3 is a block diagram of a authenticating authority data processing system consistent with the present invention.

FIG. 3 depicts authenticating authority data processing system 128 in more detail. The authenticating authority data processing system comprises a central processing unit (CPU) or processor 302, a display device 304, an input/output (I/O) unit 306, a secondary storage device 308, and a memory 310.

The situation awareness display may further comprise standard input devices such as a keyboard, a mouse, or a speech processing means (none of which are illustrated).

As will be described in more detail below, memory 310 comprises an authenticating authority program 320 that validates the user, generates an anti-theft key, and associates the anti-theft key with the user and the protected item.

Figure 4:
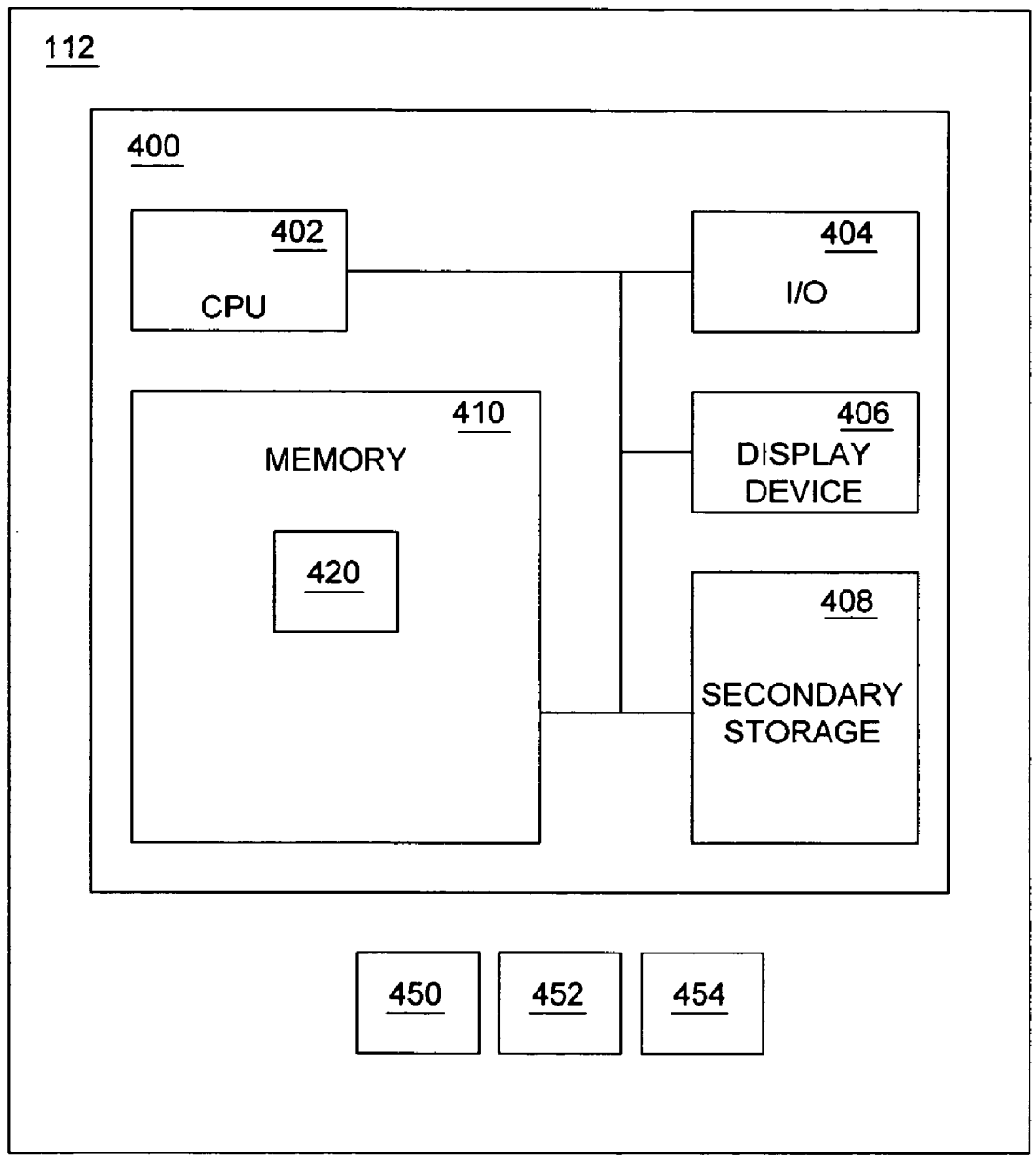
FIG. 4 is a block diagram of a physical item depot data processing system.

FIG. 4 depicts the physical item depot 112 in more detail. The physical item depot includes a physical item depot data processing system 400 and may include one or more protected items, such as protected items 450, 452, and 454 administered by the physical item depot. In FIG. 4, protected items 450, 452, and 454 are shown within the physical item depot, however, the protected items can alternatively be located remotely from the physical item depot. The physical item depot data processing system comprises a central processing unit (CPU) or processor 402, a display device 404, an input/output (I/O) unit 406, a secondary storage device 408, and a memory 410. The physical item depot data processing system may further comprise standard input devices such as a keyboard, a mouse, or a speech processing means (none of which are illustrated). As will be described in more detail below, the memory 410 comprises a physical item depot program 420 that can associate the anti-theft key with the protected item (e.g., protected item 450, 452, or 454).

Figure 5:
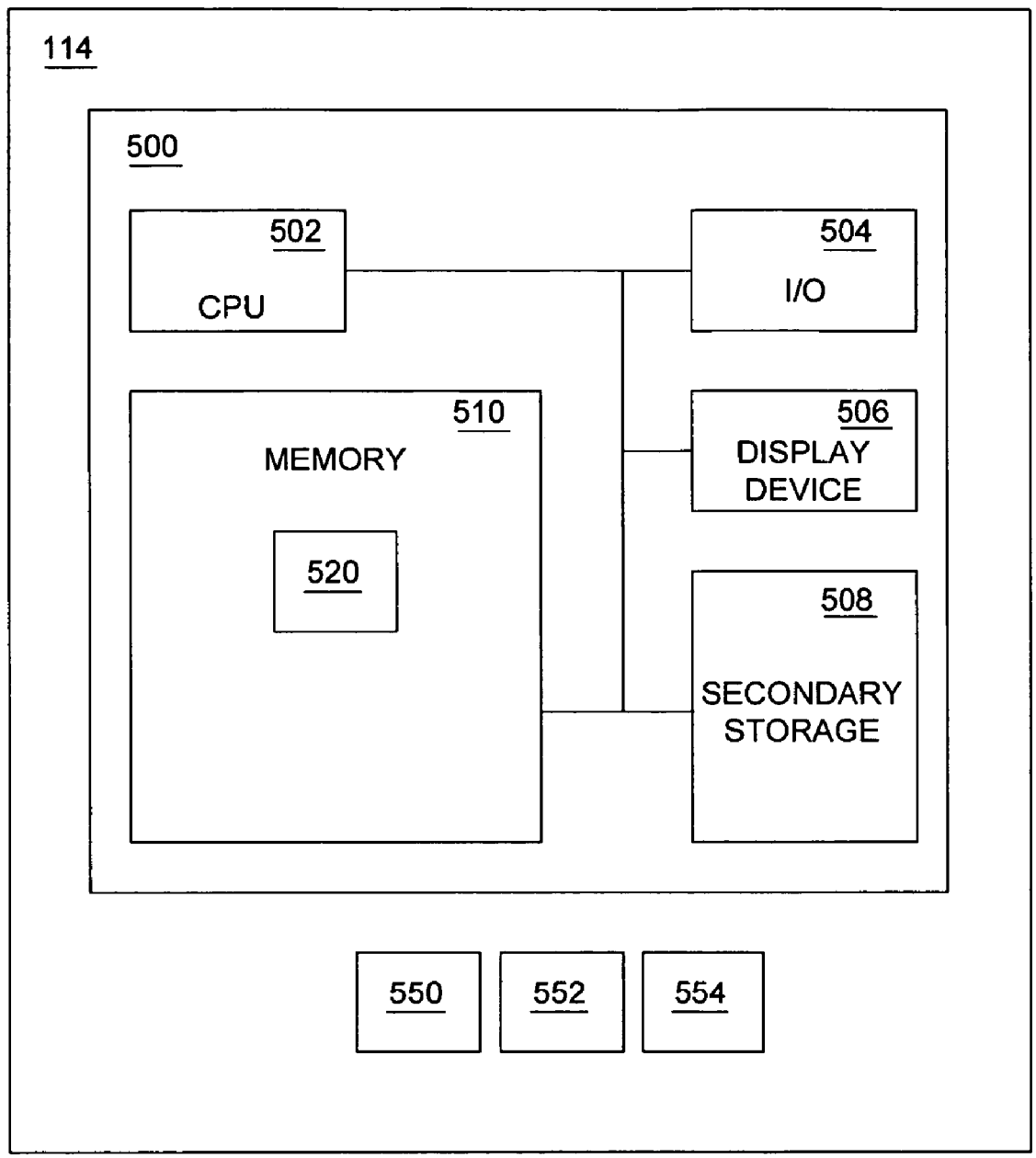
FIG. 5 is a block diagram of an intangible item depot data processing system.

FIG. 5 depicts intangible item depot 114 in more detail. The intangible item depot includes an intangible item depot data processing system 500 and may include one or more protected items, such as protected items 550, 552, and 554 administered by the intangible item depot. In FIG. 5, protected items 550, 552, and 554 are shown within the intangible item depot, however the protected items can alternatively be located remote from the intangible item depot. For example, the protected items can be stored in the intangible item depot data processing system secondary storage or in PCMCIA cards administered by the intangible item depot. The intangible item depot data processing system comprises a central processing unit (CPU) or processor 502, a display device 504, an input/output (I/O) unit 506, a secondary storage device 508, and a memory 510. The intangible item depot data processing system may further comprise standard input devices such as a keyboard, a mouse, or a speech processing means (none of which are illustrated). As will be described in more detail below, memory 510 comprises an intangible item depot program 520 that can associate the anti-theft key with the protected item (e.g., protected item 550, 552, or 554).

In the illustrative example, the various programs described herein are implemented in the C++ programming language for use with Microsoft® Windows® operating system. One having skill in the art will appreciate that the programs can be implemented in one or more other programming languages and be used with other operating systems. Microsoft and Windows are registered trademarks of Microsoft Corporation of Redmond, Wash., U.S.A.

One having skill in the art will appreciate that the various programs can reside in memory on a system other than the depicted data processing systems. The programs may comprise or may be included in one or more code sections containing instructions for performing their respective operations. Although the programs are described as being implemented as software, the present implementation may be implemented as a combination of hardware and software or hardware alone. Also, one having skill in the art will appreciate that the programs may comprise or may be included in a data processing device, which may be a client or a server, communicating with the respective data processing system.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing systems have been described, one having skill in the art will appreciate that a data processing system suitable for use with methods, systems, and articles of manufacture consistent with the present invention may contain additional or different components.

The data processing systems can also be implemented as client-server data processing systems. In that case, one or more of the programs can be stored on the respective data processing system as a client, and some or all of the steps of the processing described below can be carried out on a remote server accessed by the client over a network. The remote server can comprise components similar to those described above with respect to the data processing system, such as a CPU, an I/O, a memory, a secondary storage, and a display device.

Figure 6:
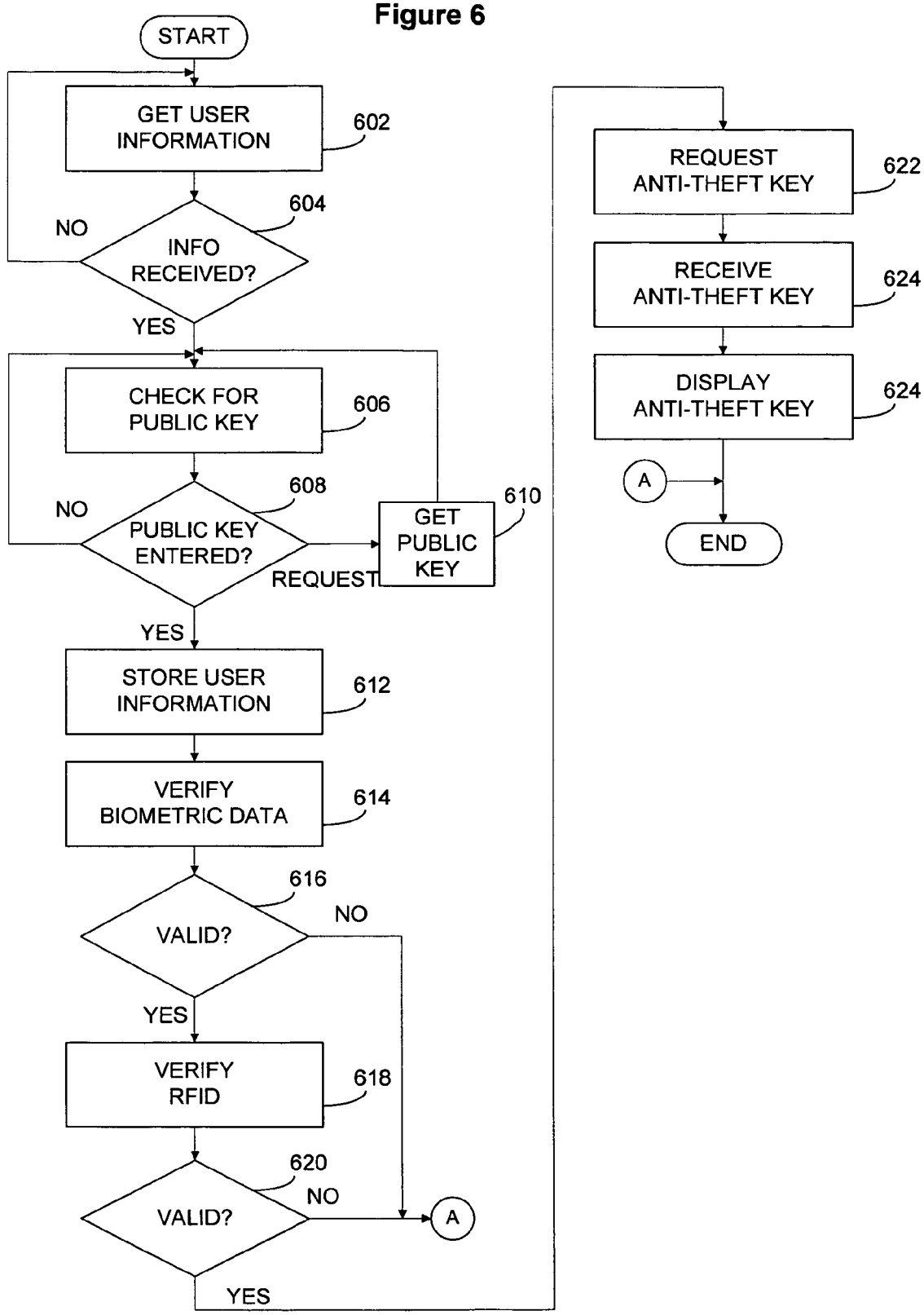
FIG. 6 is a flow diagram of exemplary steps performed by the kiosk program.

FIG. 6 depicts a flow diagram illustrating exemplary steps performed by the kiosk program in the memory of the kiosk data processing system. As shown, the kiosk program checks for inputted user information to determine whether the user has access to the anti-theft system (step 602). The user information comprises, for example, a user's personal identification number (PIN), RFID, and biometric data. The user inputs the PIN, for example, using the kiosk's keyboard. The PIN is preferably a unique code assigned to the user and can be, for example, a multiple-digit alphanumeric sequence. The kiosk program receives the user's RFID via at least one of the RFID reader and the RFID interrogator. As discussed above, the RFID is a radio frequency identification such as an encoded value or predetermined-frequency signal, transmitted from an RFID device possessed by the user. For example, the user can have an RFID device on a keychain that outputs an RFID unique to the user. Biometric information is inputted via the one or more biometric sensors in the kiosk. The biometric information can be, for example, fingerprint or retina information that is received via a fingerprint or retina scanner. One having skill in the art will appreciate that the user information is not limited to these illustrative examples. For example, the biometric information can comprise face or heartbeat information. Alternative or additional user information can be input at the kiosk. In step 602, the kiosk program also receives an input identifying the desired protected item, and sends the user information along with an identifier of the desired protected item to the authenticating authority program. The kiosk program also initiates a user session in order to get an anti-theft key for the desired protected item.

If the kiosk program determines that predetermined types of user information have not been received (step 604), then the kiosk program returns to step 602 until the required user information is received. After a predetermined number of failed attempts to obtain the user information, the authenticating authority is notified and the kiosk program ends. After the required user information has been received, the kiosk program determines whether the user has entered the user's public key (step 606). The user's public key is, for example, a 128-bit encrypted word. As will be described in more detail below, the authentication authority compares the user's public key to a private key to determine whether the user can proceed with the session to obtain an anti-theft key. The user's public key can be entered, for example, via a the kiosk keyboard or via another input device, such as a card reader. When the public key is entered, the kiosk program sends it to the authenticating authority program. If the kiosk program determines the user has not entered the user's public key (step 608), then the kiosk program returns to step 606. However, if the kiosk program receives an input indicating the user requests a public key in step 608, then the kiosk program gets a public key for the user from the authenticating authority after the user has been registered and validated with the authenticating authority (step 610). To perform step 610, after registering and validating the user with the authenticating authority, the kiosk program sends a request for the public key to the authenticating authority, which in turn generates a new public key or retrieves a public key for the user, for example from the authenticating authority database, and then returns the user's public key to the kiosk program.

After the kiosk program receives the user's public key in step 608, the kiosk program stores the user information, including the user's biometric data, PIN, and RFID, in the kiosk database (step 612). To prevent compromise of the user information, the user information is deleted after a brief period of time, such as after the anti-theft key is issued to the user. The authenticating authority program also stores the user information in the authenticating authority database. The authenticating authority program then verifies whether the user's biometric data matches biometric data for that user stored in the authenticating authority database (step 614). If the inputted biometric data is valid, the authenticating authority program sends an indication of the validity that is received at the kiosk program (step 616). Then, the authenticating authority program verifies whether the user's RFID is valid by comparing the RFID to an RFID stored in the authenticating authority database for that registered user (step 618). If the RFID is valid, the then the authenticating authority program sends an indication to the kiosk program (step 620).

Once the user is verified, the kiosk program requests an anti-theft key from the authenticating authority program (step 622). As will be described in more detail below, the authenticating authority program creates the anti-theft key by encoding the user's RFID, PIN, and biometric data using an encryption algorithm. This anti-theft key is assigned to the user and to the protected item. The kiosk program receives the anti-theft key (step 624) and notifies the user the protected item has been associated with the anti-theft key (step 626).

Figure 7:
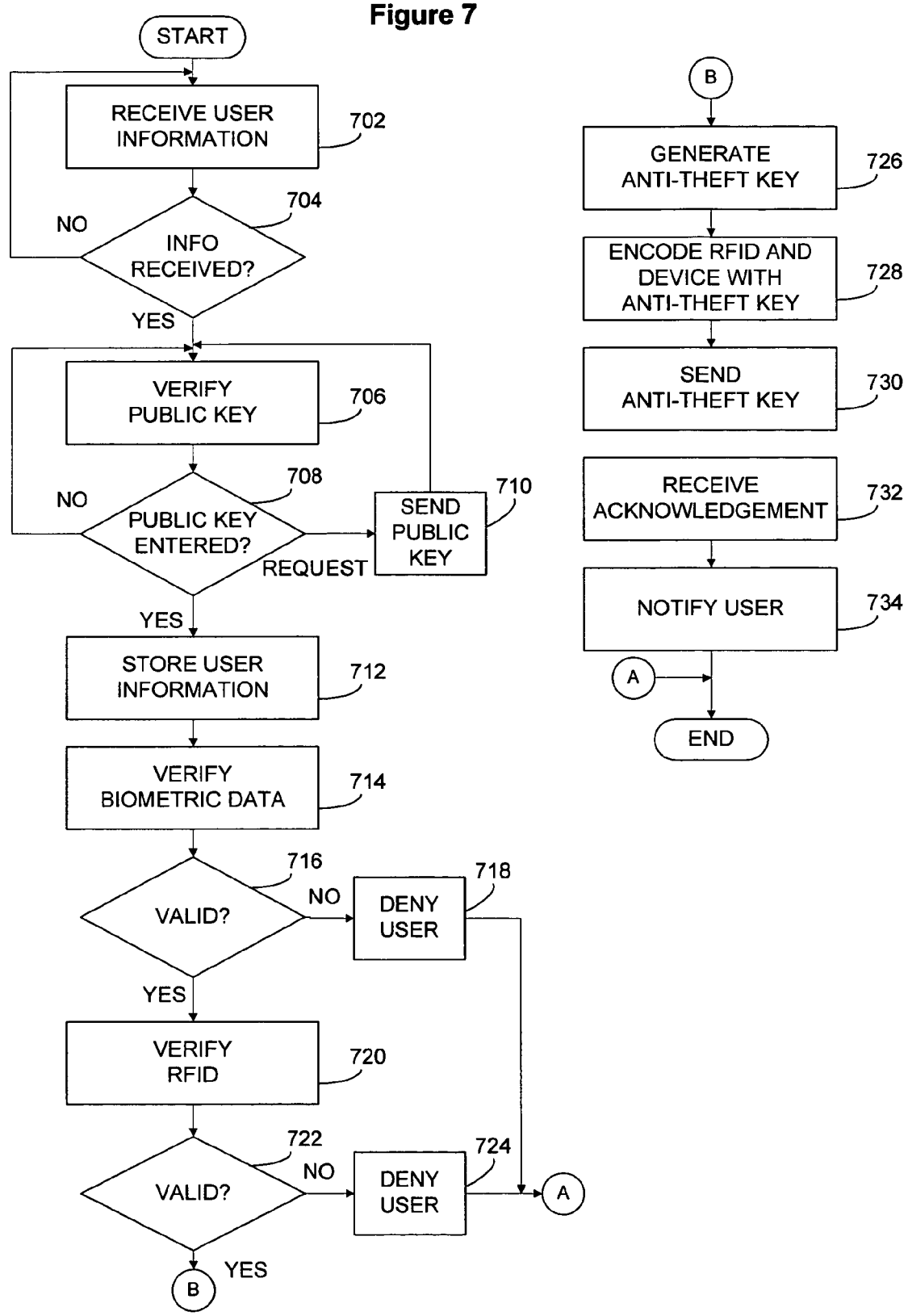
FIG. 7 is a flow diagram of exemplary steps performed by the authenticating authority program.

FIG. 7 depicts a flow diagram illustrating exemplary steps performed by the authenticating authority program in the memory of the authenticating authority data processing system. First, the authenticating authority program receives a request for a user session and the user information from the kiosk program (step 702). As discussed above, the user information can include the user's PIN, RFID, biometric information, and other information. If the authenticating authority determines it requires additional user information (step 704), then the authenticating authority program prompts the kiosk program for the additional information. After the required user information is received, the authenticating authority program receives the user's public key and verifies the public key (step 706). In the illustrative example, to verify the public key, the authenticating authority compares the user's public key to a private key associated with the user and stored in the authenticating authority database. Similar to the public key, the private key can be, for example, a 128-bit encrypted word.

If the authenticating authority program determines it has not received the user's public key (step 708), then the authenticating authority program returns to step 706. Further, if the authenticating authority program receives an input indicating the user requests a public key in step 708, then the authenticating authority program registers and validates the user and provides a public key to the user (step 710). In the preferred embodiment, the authenticating authority program retrieves the public key for the user from the authenticating authority database. The public key is associated with a corresponding private key that is also retrieved from the authenticating authority database. Alternatively, the public key can be generated in a different manner. For example, the public key can be generated based on user-specific information, such as the user's name, PIN, RFID, and/or biometric data.

After the authenticating authority program determines the user's public key is valid by comparing the public key to the corresponding private key in step 708, then the authenticating authority program stores the user information in the authenticating authority database (step 712). Then, the authenticating authority program verifies whether the user's biometric data matches biometric data for that user that is stored in the authenticating authority database (step 714). If the user's biometric data is valid, the authenticating authority program sends an indication of the validity to the kiosk program (step 716). However, if the user's biometric data is invalid, the authenticating authority program denies the user session and notifies the kiosk program (step 718).

Further, if the user's biometric data is valid, the authenticating authority program determines whether the user's RFID is valid by comparing the RFID to an RFID stored in the authenticating authority database for that user (step 720). If the RFID is valid, the authenticating authority program sends an indication of the verification to the kiosk program (step 722). Otherwise, the authentication authority program denies the user session and notifies the kiosk program (step 724).

Figure 8:
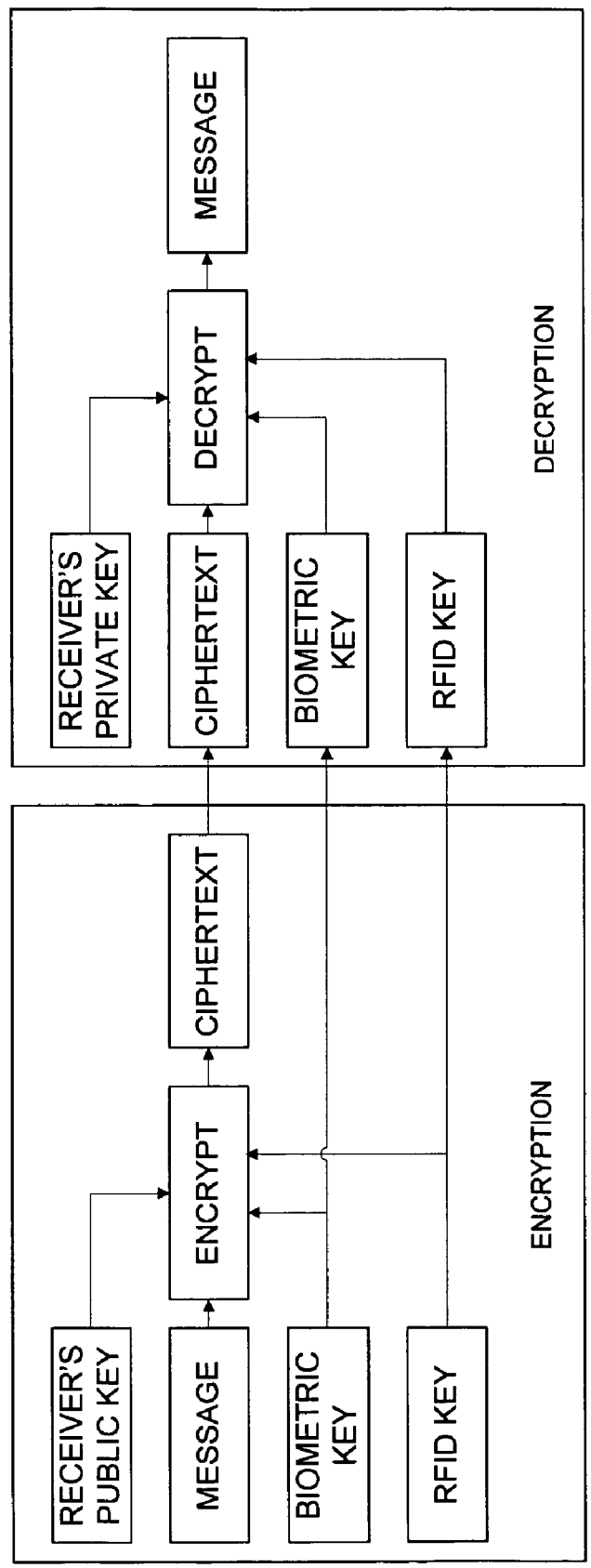
FIG. 8 is a block functional diagram showing the encryption/decryption of a public key.

After the user's RFID is verified, the authentication program generates the anti-theft key (step 726). This is performed by encoding information about the user using an encryption algorithm. In the illustrative example, the authentication authority program uses a public-key encoding/decoding mechanism that encodes the user's public key with the user's RFID and biometric data into a common anti-theft key. FIG. 8 shows a block functional diagram of public and private key encryption and decryption consistent with the present invention.

In the illustrative public key system, one key is used to encrypt data and another key is used to decrypt the data. The two key halves, which are generated together by the authenticating authority program, are referred to as the public key and the private key. The user retains the public key, while the private key is maintained by the authenticating authority. As shown in FIG. 8, in an example in which a sender wants to send an encrypted message to a receiver, the authenticating authority program encrypts the message with the receiver's public key, which can be widely distributed and provided by the sender, as well as with the receiver's RFID and biometric data that are retrieved from the authenticating authority database. The encrypted message is referred to as ciphertext for purposes of this disclosure.

When the authenticating authority program decrypts the ciphertext, the decryption algorithm uses the receiver's private key, as well as the receiver's RFID and biometric data. Thus, if the receiver's private key has been compromised, the receiver must be present to resubmit the receiver's RFID and biometric data.

Figure 9:
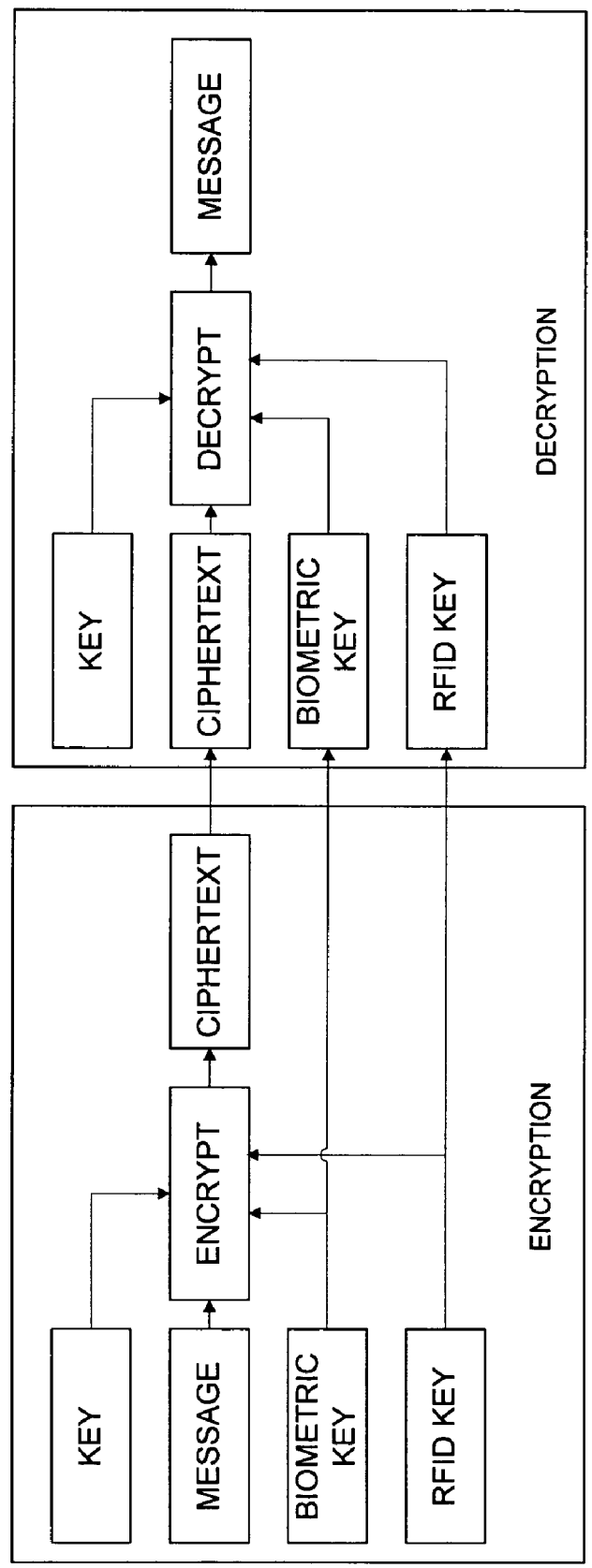
FIG. 9 is a block functional diagram showing the encryption/decryption of a secret key.

Alternatively, a different type of key encryption/decryption approach can be implemented. In this embodiment, an entity using a secret key needs one key for each entity communicating with it. FIG. 9 shows an example in which a sender wants to send a message to a receiver. The sender encodes the message with the secret key, and the sender RFID and biometric data. When the receiver receives the ciphertext, the ciphertext is decrypted using the secret key, and the receiver's RFID and biometric data. Thus, for more than one user, the authenticating authority program generates multiple levels of biometric data and RFIDs for use in the encryption and decryption algorithms. The cryptographic strength of the secret-key algorithms depends on the strength of the algorithms themselves and the key size (e.g., RFID, biometric data, and secret key sizes). If the algorithm becomes compromised, the key length can become a determining factor for breaking the encryption. Therefore, as computational power increases, it is desirable to increase the key length to provide a consistent level of protection.

Figure 10:
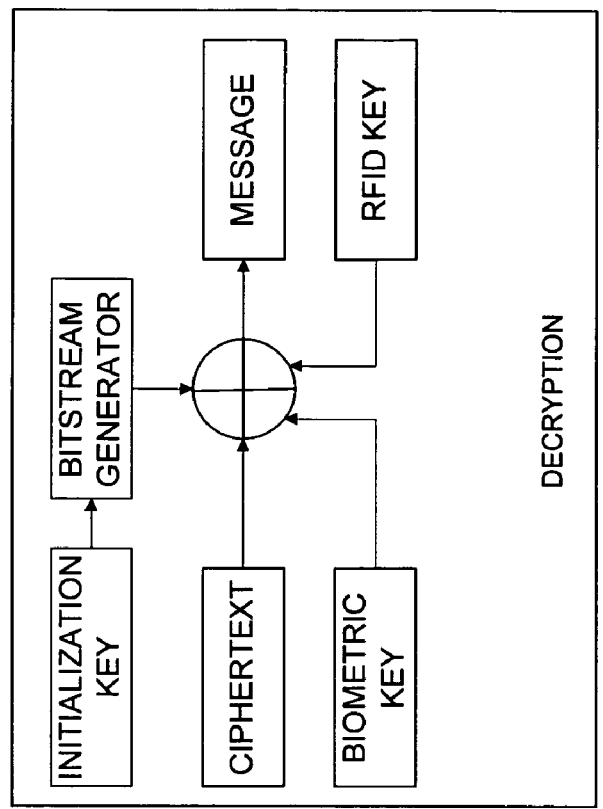
FIG. 10 is a block functional diagram showing the encryption/decryption of a stream cipher.
Figure 10:
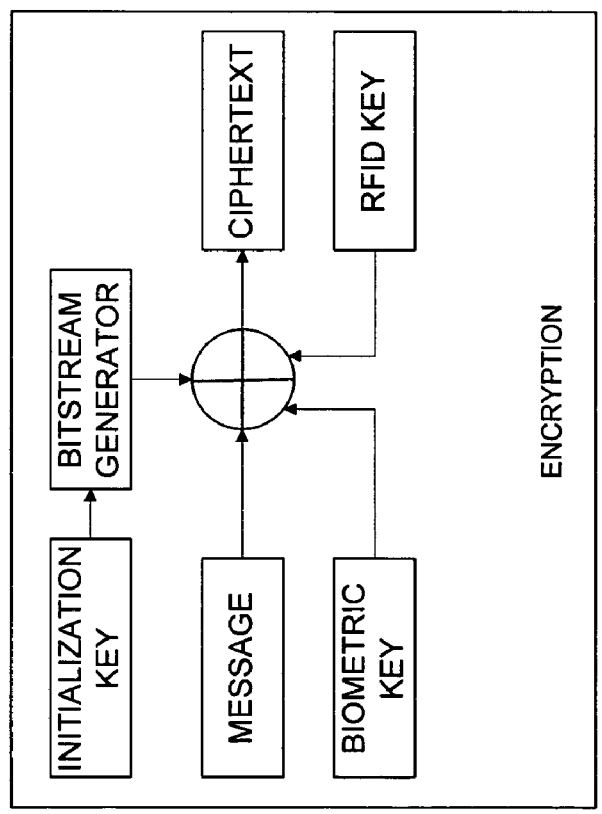

In yet another embodiment, the authentication authority program can use stream ciphers for encryption and decryption. Stream ciphers take streams of input data and combine them with streams of key material using an encryption algorithm. For example, in an example shown in FIG. 10, a message stream is encrypted with an initialization key processed through a bitstream generator, biometric data, and RFID. The receiver of the message decrypts the ciphertext using the initialization key bitstream, biometric data, and RFID. When encrypting the message, the authenticating authority preferably uses the receiver's RFID and biometric data. However, the sender's information can alternatively or additionally be used. In the latter case, the authenticating authority program generates multiple levels of biometric data and RFIDs for use in the encryption and decryption algorithms.

In the illustrative example, the authenticating authority program uses the Data Encryption Standard for each type of encryption and decryption. The Data Encryption Standard and its use is known in the art and will not be described in more detail herein. Information on the Data Encryption Standard can be found in *Data Encryption Standard*, Federal Information Processing Standard (FIPS) Publication 46, National Bureau of Standards, U.S. Department of Commerce, Washington, D.C. (January 1977), which is incorporated herein by reference.

Referring back to FIG. 7, in the illustrative embodiment, the authenticating authority program encrypts the user's public key, biometric data, and RFID to create the anti-theft key. Alternative or additional information can also be used to encode the anti-theft key. For example, the authenticating authority program can also use the user's name and PIN when encoding the anti-theft key. With the incorporation of the RFID and biometric data into the anti-theft key, the anti-theft key provides a level of protection exceeding traditional keys and can be beneficially limited to verification of the user's biometric data and RFID during decryption.

After generating the anti-theft key in step 728, the authenticating authority program assigns the anti-theft key to the user and to the protected item, and sends the anti-theft key to the depot where the protected item is located (step 730). As discussed above, the depot is a repository containing the protected item. The depot authenticates the authenticating authority and then receives the anti-theft key upon successful authentication. Upon receipt of the anti-theft key, the depot notifies the authenticating authority program (step 732). In turn, the authenticating authority program notifies the user, via the kiosk program, that the protected item has been encoded with the anti-theft key (step 734). Accordingly, the user can retrieve the protected item.

Figure 11:
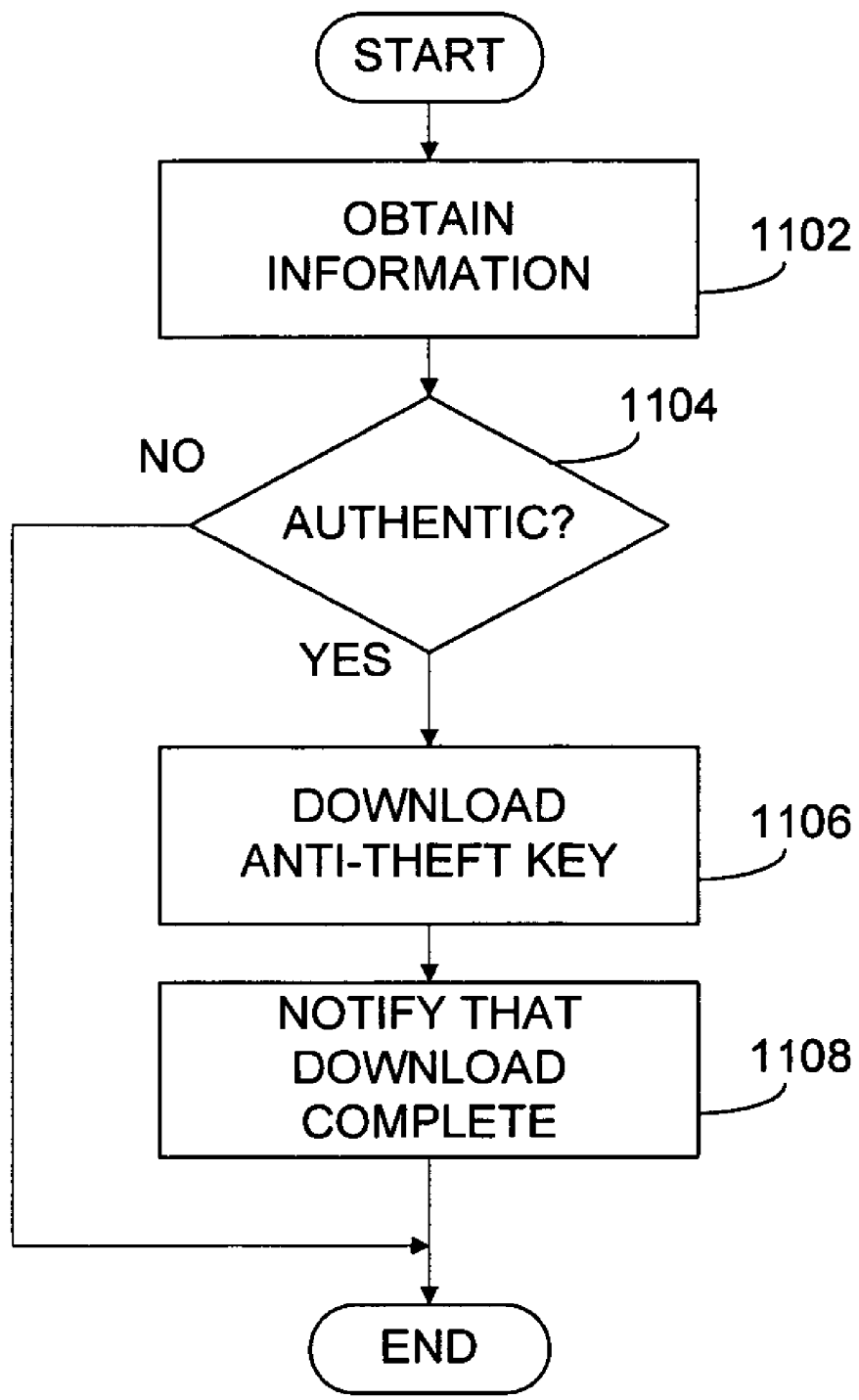
FIG. 11 is a flow diagram of exemplary steps performed by the physical item depot program.

As discussed above, the protected item can be physical item, such as a vehicle or weapon, or an intangible item, such as software or a carrier wave. In the illustrative example, separate depots maintain physical-object protected items and intangible-item protected items. Alternatively, a common depot can be used for all protected items. Further, multiple depots can be implemented, with each depot maintaining physical items, intangible items, or both. FIG. 11 depicts a flow diagram illustrating exemplary steps performed by the physical item depot program in the memory of the physical object depot data processing system. First, the physical item depot program receives an indication from the authenticating authority program to start a communication session (step 1102). Before initiating a communication session, the physical item depot program validates the authenticating authority, for example by comparing the identification of the authenticating authority to a list of known authenticating authorities (step 1104). If the authenticating authority is valid, then the physical item depot program downloads the anti-theft key from the authenticating authority (step 1106). After the anti-theft key is downloaded, the physical item depot program uploads the anti-theft key to the protected item and notifies the authenticating authority program that the download is complete (step 1108). Uploading the anti-theft key to the protected item can comprise, for example, uploading the anti-theft key into a memory of the protected item or notifying an operator to physically attach a printout of the anti-theft key to the protected item. For example, if the protected item is a vehicle, the operator can attach to the vehicle a bar code label including the anti-theft key, or the anti-theft key can be stored in a field programmable gate array in the vehicle.

Figure 12:
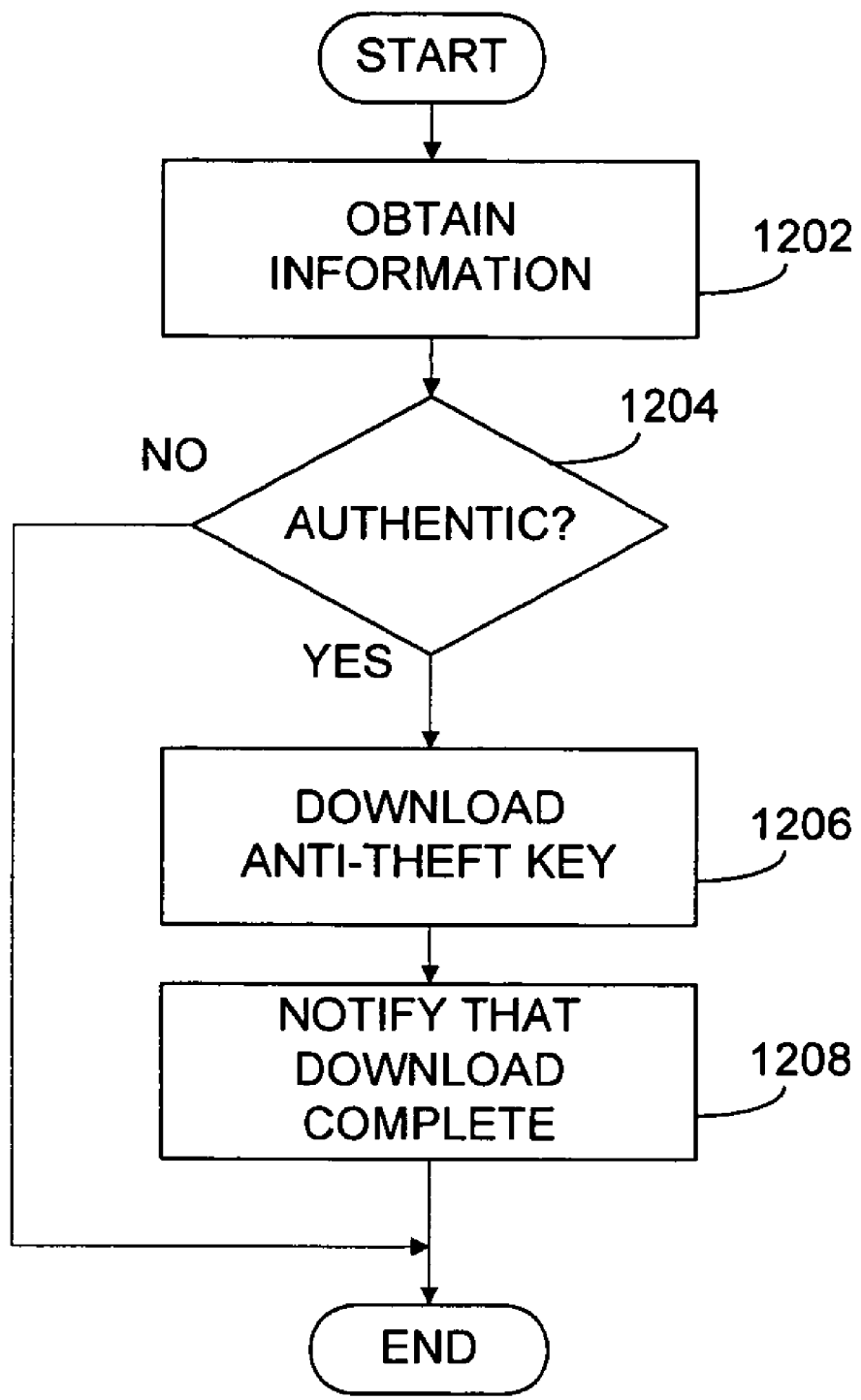
FIG. 12 is a flow diagram of exemplary steps performed by the intangible item depot program.

FIG. 12 depicts a flow diagram illustrating exemplary steps performed by the intangible item depot program in the memory of the intangible item depot data processing system. The intangible item depot program first receives an indication from the authenticating authority program to start a communication session (step 1202). Before initiating a communication session, the intangible item depot program validates the authenticating authority, for example, by comparing the identification of the authenticating authority to a list of known authenticating authorities (step 1204). If the authenticating authority is valid, then the intangible item depot program downloads the anti-theft key from the authenticating authority (step 1206). After the anti-theft key is downloaded, the intangible item depot program uploads the anti-theft key to the protected item and notifies the authenticating authority program the download is complete (step 1208).

Uploading the anti-theft key to the protected item can comprise, for example, uploading the anti-theft key into a memory of the protected item or encoding the anti-theft key into the item itself. For example, if the protected item is a software program, the anti-theft key can be associated with the software program, such that the software program will not run unless the anti-theft key is provided by the user. Further, in the case in which the protected item is a software program, the anti-theft key may grant access to either portions of the software program or the entire program.

Therefore, unlike conventional anti-theft systems that use RFID keys, methods, systems, and articles of manufacture consistent with the present invention provide anti-theft keys encoded with a user's RFID, as well as the user's biometric data. Thus, the anti-theft key is not compromised when misappropriated because the anti-theft key is validated against the user's RFID and biometric data.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. Further, the illustrative processing steps performed by the programs can be executed in an different order than described above, and additional processing steps can be incorporated. Further, one or more of the kiosks, authenticating authorities, and depots can be implemented on common data processing systems. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense

What is claimed is:

1. A system comprising:
   an RFID device having a radio frequency identification;
   a device for receiving an anti-theft key from an authentication authority, the anti-theft key being encoded with a radio frequency identification associated with an authorized user and also biometric data of the authorized user;
   a protected item that, once programmed with the anti-theft key, obtains an RFID and biometric data from a person who attempts to use the protected item, and grants use of the protected item to the person if the obtained RFID and biometric data match the biometric data and RFID in the anti-theft key; and
   a kiosk for issuing the RFID device to the authorized user, associating the RFID of the issued RFID device with the authorized user, obtaining biometric data from the authorized user, and sending the associated RFID and the biometric data to the authenticating authority, which generates the anti-theft key;
   wherein the device for receiving the anti-theft key includes a processor at the storage location, the processor used to load the anti-theft key into the protected item.

2. The system of claim 1, wherein the anti-theft key is data, and wherein the device for storing the anti-theft key includes a processor at the storage location for storing the anti-theft key in memory of the protected item.

3. A method of allowing a person to use a vehicle stored at a storage location, the method comprising:
   issuing an RFID device to the person, the RFID device having an RFID;
   associating the RFID with the person;
   receiving an anti-theft key associated with the person, the anti-theft key received at the storage location, the anti-theft key including the associated RFID and biometric data of the person, the anti-theft key being separate and distinct from the RFID device;
   protecting the vehicle at the storage location, including loading the anti-theft key into the vehicle;
   wherein the vehicle, once loaded with the anti-theft key, grants access to a person who presents an RFID device having an RFID that matches the RFID in the anti-theft key and whose biometric data matches the biometric data in the anti-theft key.

4. The method of claim 3, wherein the anti-theft key controls at least one of when the protected vehicle is obtained, turned-on, operated and returned.

5. The method of claim 3, wherein the protected vehicle is also protected while in an operating state, after it has left the storage location.

6. The method of claim 3, wherein the anti-theft key is used to control storage or operation of the protected vehicle.

7. The method of claim 3, wherein the protected vehicle also grants access to at least one additional person whose biometric data matches the data in the anti-theft key.

8. The method of claim 3, further comprising obtaining biometric data of the person and authenticating the person prior to releasing the protected vehicle at the depot.

9. The method of claim 8, wherein authenticating the person includes generating encryption and decryption keys for the protected vehicle and wherein the encryption key is used to encrypt information in the anti-theft key and the decryption key is used by the protected vehicle.

10. The method of claim 3, wherein a kiosk is used to obtain biometric data from the person and initiate generation of the anti-theft key.

11. A depot comprising:
a plurality of vehicles to be protected;
a site for issuing RFID devices to authorized users and initiating generation of an anti-theft key when an RFID device is issued to a user, each RFID device having an RFID, each anti-theft key having an RFID of an issued device and biometric data of a user to whom the device is issued; and
apparatus for receiving anti-theft keys from an authentication authority and programming the anti-theft keys into those vehicles that are authorized to be used;
each vehicle being programmable with an anti-theft key and capable of obtaining an RFID and biometric user from a user who attempts to use said vehicle;
wherein a vehicle that is programmed with an anti-theft key will grant use of the vehicle only to a user whose obtained biometric data and RFID matches the biometric data and RFID in that anti-theft key.

12. The depot of claim 11, wherein a kiosk issues the RFID devices and also obtains biometric data from authorized users, the kiosk initiating generation of the anti-theft keys by an authenticating authority.

13. The depot of claim 11, wherein a vehicle that is programmed with an anti-theft key is also protected while in an operating state, after it has left the depot.

14. The depot of claim 11, wherein the anti-theft key controls at least one of when the protected vehicle is obtained, turned-on, operated and returned.

* * * * *